United States Patent [19]

Kawamura et al.

[11] Patent Number: 5,370,725
[45] Date of Patent: Dec. 6, 1994

[54] SYNCHRONIZER RING

[75] Inventors: Osamu Kawamura; Toshiaki Sato; Takao Omiya, all of Tochigi, Japan

[73] Assignee: Nippon Piston Ring Co., Ltd., Tokyo, Japan

[21] Appl. No.: 155,699

[22] Filed: Nov. 23, 1993

[30] Foreign Application Priority Data

Nov. 30, 1992 [JP] Japan ................................ 4-345282

[51] Int. Cl.$^5$ ................................................ C22C 29/00
[52] U.S. Cl. ........................................ 75/243; 75/246; 192/107 M
[58] Field of Search ............... 75/243, 246; 192/107 M

[56] References Cited

U.S. PATENT DOCUMENTS

| | | | |
|---|---|---|---|
| 3,802,849 | 4/1974 | Kimura et al. | 428/582 |
| 4,943,321 | 7/1990 | Akutsu | 75/243 |
| 5,049,183 | 9/1991 | Saka et al. | 75/244 |

FOREIGN PATENT DOCUMENTS

| | | |
|---|---|---|
| 3705661 | 3/1989 | Germany . |
| 46-15043 | 4/1971 | Japan . |

*Primary Examiner*—Donald P. Walsh
*Assistant Examiner*—Ngoclan T. Mai
*Attorney, Agent, or Firm*—Sughrue, Mion, Zinn, Macpeak & Seas

[57] ABSTRACT

A synchronizer ring having a stabilized friction characteristic relative to a taper cone and having sufficient mechanical strength and anti-abrasion characteristic. The synchronizer ring is made from a ferrous sintered alloy containing 0.2 to 1.0% by weight of carbon, 8.0 to 15.0% by weight of copper, 0.1 to 7.0% by weight of at least one component selected from a group consisting of chromium, manganese, molybdenum, and phosphorus, and balance iron and inevitable impurities. A free copper is precipitated in a matrix of the sintered alloy. Porosity of the sintered alloy is from 3 to 8 vol %.

2 Claims, 2 Drawing Sheets

SYNCHRONIZER RING

BACKGROUND OF THE INVENTION

The present invention relates to a synchronizer ring, and more particularly, to a type thereof having excellent friction characteristics and sufficient anti-abrasion and endurance characteristics, and provided with stabilized high quality.

Synchronizer rings have been conventionally used in synchronized gear-meshing type transmissions or speed changers. The synchronizer ring 1 shown in FIG. 1 is a friction ring for selectively synchronously sliding with and separating from a rotating opposing member, that is, a taper cone. The synchronizer ring 1 performs the essential operation of matching the circumferential speeds of rotating gears to avoid clashing therebetween when meshing.

As is well known, a conventional synchronizer ring 1, generally formed from brass (Cu—Zn alloy), is cylindrical with an outer surface provided with an outer rim portion 105 and a plurality of teeth 100, and an inner surface 101 for contacting the cone. The plurality of teeth 100 are provided at a predetermined interval to the extreme outer circumference of a synchronizer ring. The teeth 100 are for engaging with a different opposing member such as a toothed ring (not shown). A key groove 104 for engaging a synchronizer key (not shown) is provided to the outer rim portion 105. To the inner surface 101 of the synchronizer ring are provided a plurality of annular grooves 102 for applying friction force. Further, linear grooves 103 are provided, as necessary, orthogonally to the annular grooves 102 for allowing movement of lubricating oil.

Conventional synchronizer rings 1 formed with the above-described structure, must have in general high mechanical strength and high precision. Increases in transmission quality and performance in recent years have increased their reliability. However, in addition to reliability, transmissions are required to provide a luxurious or sporty feel when driving the car. To provide these attributes, the inner surface 101 of the synchronizer ring 1 must have excellent friction and anti-abrasion characteristics. This has increased requirements for friction and anti-abrasion characteristics of the inner surface 101 of synchronizer rings.

Various proposals have been made in an attempt to improve friction characteristic and anti-abrasion characteristic or wear resistance at the inner surfaces of the synchronizer rings. In one example, as described in Japanese Patent Publication (Kokoku) No. SHO-46-15043, a uniform mixture of metal, ceramic, and an oxide are sprayed and fuse-bonded onto the inner surface of the synchronizer ring. Also West German Patent No. 3705661 describes a method for producing a friction ring, the method being applicable during production of the synchronizer ring. In this method, a friction lining, formed from, for example, a sintered powder containing 80% by weight powdered metal material and 20% by weight powdered non-metal material, is flame sprayed onto the inner surface.

However, conventional synchronizer rings obtained by spraying and fuse-bonding a uniformly mixed mixture of metal, ceramic, and oxide onto the inner surface of the synchronizer ring or by flame spraying a friction liner, formed from, for example, a sintered powder containing 80% by weight powdered metal material and 20% by weight powdered non-metal material, onto the inner surface, do not provide friction or anti-abrasion characteristics sufficient to meet increasing consumer demands. Also, the synchronizer rings formed with these methods may lack sufficient strength when metal components are not evenly distributed. Further, quality may become insufficient due to local variation of compositions in the sprayed layer. Frequently, particles incompletely fused in the flame, or which scatter or bounce off during spraying, become trapped in the surface layer of the sprayed film. Because these particles have been known to form excessively rough areas on the surface, the friction characteristic can easily change over a period of time. When these particles become separated from the surface, they have been known to abrade various parts in the transmission. On the other hand, attempts have been made to reduce the excessively rough areas by grinding or machining the surface of the sprayed-on film, but grinding and machining increases costs and wastes materials, affecting the yield.

SUMMARY OF THE INVENTION

An objective of the present invention is to provide a high-quality, inexpensive synchronizer ring having high mechanical strength with excellent friction and anti-abrasion characteristics. An additional objective of the present invention is to provide a synchronizer ring having stabilized quality and which does not require grinding or machining of the sprayed-on film.

These and other objects of the present invention will be attained by providing an improved synchronizer ring which selectively synchronously slides with and separates from a rotating opposing member. The synchronizer ring is made from a ferrous sintered alloy consisting essentially of 0.2 to 1.0% by weight of carbon, 8.0 to 15.0% by weight of copper, 0.1 to 7.0% by weight of at least one component selected from a group consisting of chromium, manganese, molybdenum, and phosphorus, and balance iron and inevitable impurities. A free copper is precipitated in a matrix of the sintered alloy.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
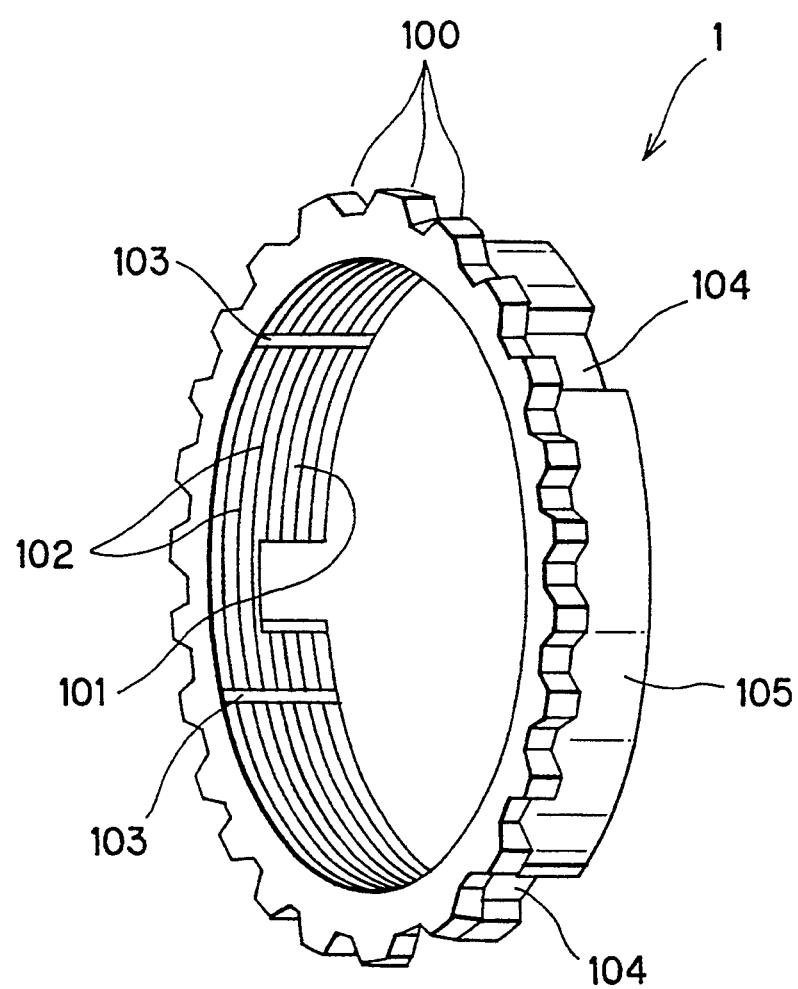
FIG. 1 is a perspective view showing a conventional synchronizer ring.

A synchronizer ring according to a preferred embodiment of the present invention will be described while referring to the accompanying drawings.

First, reasons for the percentile limitations of each of the compositions of the synchronizer ring according to the present invention will be described.

In the present invention, carbon (C) is contained in the sintered alloy by 0.2 to 1.0% by weight. Inclusion of carbon improves strength and anti-abrasion characteristics of the synchronizer ring. However, such increases are seen only when 0.2% or more by weight of carbon is included. On the other hand, including carbon in amounts exceeding 1.0% by weight diminishes toughness of the ring and predisposes the ring to damage the opposing member. Therefore the limit for carbon was set at between 0.2 wt % and 1.0 wt %.

Copper (Cu) is contained in the sintered alloy by 8.0 to 15.0% by weight. Inclusion of a free copper layer improves kinetic friction. Copper is solid-solved into the matrix by diffusion coating powdered copper at a temperature higher than its melting point into iron powders, retaining melt-off pores. That is, prior to reaching the melting point of the copper, minute pores are defined among the powders. However, after the melting point thereof, molten Cu is entered into minute pores by capillary action to provide the melt-off pores. Because a copper-alpha iron (αFe) matrix can hold a maximum of 8% by weight copper, a free copper phase will precipitate out only when not less than 8% by weight copper is contained. On the other hand, if copper amounts exceeds 15% by weight, mechanical characteristics such as strength and toughness of the sintered alloy tend to drop. Therefore 8 to 15 wt % copper was decided on.

Inclusion of chromium (Cr), manganese (Mn), molybdenum (Mo), or phosphorus (P), or any combination of these, improves strength and toughness, and also improves the anti-abrasion characteristics accompanied by an increase in hardness. However, the collective amount of these materials must be 0.1% or more otherwise improvements can not be obtained. On the other hand, increasing the collective amount of these materials over 7.0% provides no further increase in these improvements. Therefore, the collective amount of these materials was set at 0.1 to 7.0 wt %.

In regards to porosity, the greater the porosity, the greater the friction force. Contrarily, the lower the porosity, the greater the anti-abrasion characteristics. The inner surface, which frictionally contacts the taper cone, must have particularly high friction force and also excellent anti-abrasion characteristics. Thus, the porosity must be configured in an attempt to balance a number of conflicting consideration of the friction force and the anti-abrasion characteristic. Reducing porosity to less than 3% of total volume excessively degrades friction force, but increasing porosity over 8% of total volume causes strength and anti-abrasion characteristics to depreciate. Therefore, the porosity was set with the range 3 to 8% of total volume.

Next, several specific examples according to the present invention will be described.

Were prepared graphite powder, copper powder, and Fe—Cr—Mn—Mo—P alloy powder(Cr:1.10%, Mn:0.63%, Mo:0.32%, P:0.20%, Fe:remainder), all with particle size of 150 or less mesh. These components were mixed in the amounts shown in Table 1 to obtain Example 1, Example 2 those in accordance with the present invention and Comparative Example. After mixing under normal conditions, the powder mixture was press-molded into a powder compact at 6 ton/cm². The powder compact was sintered in decomposed ammonia gas at a predetermined temperature within the range between 1,000 to 1,200° C. for 80 minutes to form a sintered compact with material make up substantially the same as shown in Table 1.

TABLE 1

| | Constitution of Sintered Compounds | | | | | | |
|---|---|---|---|---|---|---|---|
| | Compound Constituent (by % weight) | | | | | | |
| | C | Cu | Cr | Mn | Mo | P | Fe* |
| Example 1 | 0.6 | 10.0 | 1.0 | 0.6 | 0.3 | 0.2 | remainder |

TABLE 1-continued

| | Constitution of Sintered Compounds | | | | | | |
|---|---|---|---|---|---|---|---|
| | Compound Constituent (by % weight) | | | | | | |
| | C | Cu | Cr | Mn | Mo | P | Fe* |
| Example 2 | 0.6 | 15.0 | 1.0 | 0.6 | 0.3 | 0.2 | remainder |
| Comp. Example | 0.6 | 5.0 | 1.0 | 0.6 | 0.3 | 0.2 | remainder |

*includes impurities of the entire mixture

As can be seen in Table 1, components were mixed in the same amounts in the first example, the second example, and the comparative example, except the amount of copper by weight. That is, the first example contained 10% by weight copper, the second example contained 15% by weight copper, and the comparative example contained 5% by weight copper.

The friction characteristics of the sintered body was evaluated in the following manner.

Friction characteristics were determined by measuring the friction coefficient at the conditions listed below using the rotational planar slide friction testing apparatus shown in FIG. 2.

| Test Conditions | |
|---|---|
| Pressing load: | 25 Kgf, 80 Kgf |
| Slide speed: | 1 m/sec. |
| Pressing time: | 0.2 seconds |
| Lubricating oil: | 75 W-90 (gear oil or mineral oil defined in SAE standard) |
| Oil temperature: | 55° C. |
| Rate of oil supply: | 0.04 liters/min. |
| Material of opposing member: | SCr420 [surface hardness (Hv) 580] which is defined in JIS G 4104 containing C: 0.18–0.23, Si: 0.15–0.35, Mn: 0.60–0.85, P: not more than 0.030, S: not more than 0.030, Cr: 0.90–1.20, Fe: balance. |

Figure 2:
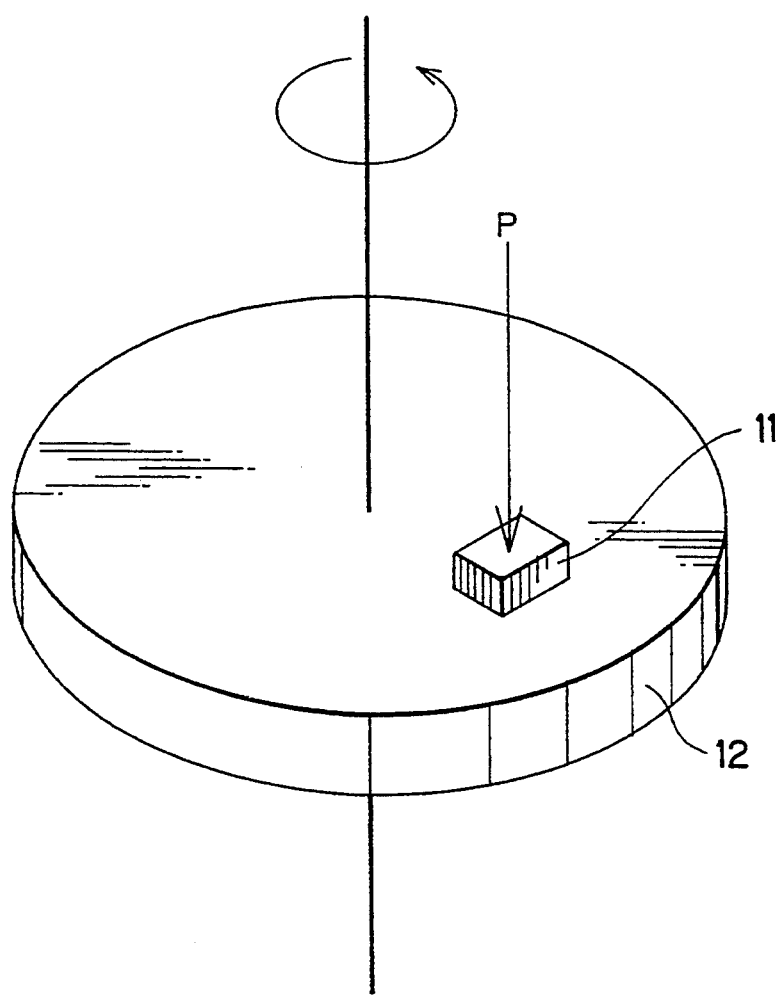
FIG. 2 is a perspective view schematically showing a rotational planar slide friction testing apparatus for determining coefficient of kinetic friction of a sample according to the present invention.

FIG. 2 is a schematic diagram showing a rotational planar slide friction testing apparatus for measuring the friction coefficient of the synchronizer ring sample 11 when the synchronizer ring sample 11 is pressed at a predetermined pressure (P) for a set time onto the rotating surface of the opposing member 12. The opposing member 12 rotates at a set speed.

The coefficient of kinetic friction of iron-based sintered alloys according to the first and second examples and the comparative example are shown in Table 2.

TABLE 2

| | Friction Characteristics | | | |
|---|---|---|---|---|
| | | | Coefficient of Kinetic Friction ($\mu$) | |
| | Free Cu Rate | Porosity | Pressing Load | |
| | (% area) | (% vol.) | 25 Kgf | 80 Kgf |
| 1st Example | 5.0 | 3.0 | 0.100 | 0.110 |
| 2nd Example | 8.0 | 6.0 | 0.110 | 0.120 |
| Comp. Example | 0.0 | 3.0 | 0.045 | 0.095 |

As can clearly be determined from Table 2, the coefficient of kinetic friction of the synchronizer ring sample according to the present invention was stable under pressing load of both 25 Kgf, i.e., slow synchronization, and 80 Kgf, i.e., fast synchronization. However, the coefficient of kinetic friction observed in the comparative example at 25 Kgf (slow synchronization) is one half the value observed at 80 Kgf (fast synchronization), indicating an unstable synchronization ability particularly at low synchronization.

The percentage surface area of free copper was 3 to 8% when the amount of copper was 10% by weight, and 5 to 10% when the amount of copper was 15% by weight. Free copper, bainite, and pearlite phases coexist in the matrix. The matrix hardness (HV 0.1, where "0.1" implies MicroVickers hardness with applied load of 100 g) of the bainite phase is 560 to 640. The matrix hardness (HV 0.1) of the pearlite phase is 310 to 350. The free copper phase is softer than these phases, with hardness (HV 0.1) of 120 to 160. It becomes apparent that the free copper phase provides a soft material for stabilizing the friction characteristic in a resultant friction member.

When necessary, the free copper phase can be precipitated using a copper-based alloy such as Cu—Zn and Cu—Sn.

The present invention thus provides a synchronizer ring with stable friction characteristics and quality without forming a sprayed-on layer and without grinding or machining to the sprayed-on layer. The present invention also provides a synchronizer ring which is capable of performing excellent synchronous rotation and separation relative to the cone.

While the invention has been described in detail with reference to specific embodiments thereof, it would be apparent to those skilled in the art that various changes and modifications may be made therein without departing from the spirit of the invention.

What is claimed is:

1. A synchronizer ring which selectively synchronously slides with and separates from a rotating opposing member, the synchronizer ring being made from an iron-based sintered alloy consisting essentially of 0.2 to 1.0% by weight of carbon, 8.0 to 15.0% by weight of copper, 0.1 to 7.0% by weight of at least one component selected from a group consisting of chromium, manganese, molybdenum, and phosphorus, and balance iron and inevitable impurities, a free copper being precipitated in a matrix of the sintered alloy.

2. The synchronizer ring as claimed in claim 1, wherein porosity of the sintered alloy is from 3 to 8% by volume.

* * * * *